(12) United States Patent
Danneberg et al.

(10) Patent No.: US 12,304,295 B2
(45) Date of Patent: May 20, 2025

(54) ENERGY STORE FLOOR ASSEMBLY

(71) Applicant: Bayerische Motoren Werke Aktiengesellschaft, Munich (DE)

(72) Inventors: Jan Danneberg, Munich (DE); Michael Hainzinger, Volkenschwand (DE); Nermin Kecalevic, Markt Schwaben (DE); Ingo Kuwalefsky, Markt Schwaben (DE); Juergen Leschhorn, Geltendorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 234 days.

(21) Appl. No.: 17/794,013

(22) PCT Filed: Jan. 26, 2021

(86) PCT No.: PCT/EP2021/051668
§ 371 (c)(1),
(2) Date: Jul. 20, 2022

(87) PCT Pub. No.: WO2021/151856
PCT Pub. Date: Aug. 5, 2021

(65) Prior Publication Data
US 2023/0045568 A1 Feb. 9, 2023

(30) Foreign Application Priority Data
Jan. 31, 2020 (DE) ...................... 10 2020 102 480.0

(51) Int. Cl.
*B60K 1/04* (2019.01)
*B60L 50/64* (2019.01)

(52) U.S. Cl.
CPC .............. *B60K 1/04* (2013.01); *B60L 50/64* (2019.02); *B60K 2001/0438* (2013.01); *B60Y 2306/01* (2013.01)

(58) Field of Classification Search
CPC ... B60K 1/04; B60K 2001/0438; B60L 50/64; B60Y 2306/01; Y02E 60/10; B62D 25/20
See application file for complete search history.

(56) References Cited

U.S. PATENT DOCUMENTS

| 5,390,754 A | 2/1995 | Masuyama et al. |
| 5,501,289 A * | 3/1996 | Nishikawa ............... B60K 1/04 280/783 |

(Continued)

FOREIGN PATENT DOCUMENTS

| CN | 109690814 A | 4/2019 |
| CN | 110435764 A | 11/2019 |

(Continued)

OTHER PUBLICATIONS

International Search Report (PCT/ISA/210) issued in PCT Application No. PCT/EP2021/051668 dated Mar. 15, 2021 with English translation (four (4) pages).

(Continued)

*Primary Examiner* — Steve Clemmons
(74) *Attorney, Agent, or Firm* — Crowell & Moring LLP

(57) ABSTRACT

An energy store floor assembly for an electrically driven motor vehicle includes an electrical energy store device, which is accommodated in a multi-part store housing and is situated on the underside of a vehicle floor of the energy store floor assembly. To create an energy store floor assembly which can be constructed in a more simple and lightweight manner, at least one longitudinal support is arranged inside the store housing of the energy store device and is connected at least at one end at least indirectly to a motor vehicle support component situated in the region of the front end.

14 Claims, 4 Drawing Sheets

(56) References Cited

U.S. PATENT DOCUMENTS

| | | | | |
|---|---|---|---|---|
| 5,833,023 | A * | 11/1998 | Shimizu | B60L 53/80 |
| | | | | 180/68.5 |
| 9,045,030 | B2 * | 6/2015 | Rawlinson | B60L 50/66 |
| 10,069,123 | B2 * | 9/2018 | Maguire | B60K 1/04 |
| 10,207,573 | B2 * | 2/2019 | Hara | H01M 50/264 |
| 10,688,854 | B2 * | 6/2020 | Caliskan | B60K 1/04 |
| 10,985,422 | B2 * | 4/2021 | Günther | H01M 50/276 |
| 11,670,818 | B2 * | 6/2023 | White | H01M 50/209 |
| | | | | 429/97 |
| 2013/0273755 | A1 | 10/2013 | Yokoyama | |
| 2014/0284125 | A1 | 9/2014 | Katayama et al. | |
| 2019/0061506 | A1 | 2/2019 | Kappich | |
| 2019/0337575 | A1 | 11/2019 | Kellner et al. | |
| 2020/0189378 | A1 | 6/2020 | Hirsch et al. | |
| 2021/0221436 | A1 | 7/2021 | Tsuyuzaki et al. | |

FOREIGN PATENT DOCUMENTS

| | | | |
|---|---|---|---|
| CN | 110537267 A | 12/2019 | |
| CN | 110636968 A | 12/2019 | |
| DE | 10 2012 000 622 A1 | 7/2013 | |
| DE | 102012203882 A1 * | 9/2013 | B60K 1/04 |
| DE | 10 2013 103 154 A1 | 10/2013 | |
| DE | 10 2017 119 132 B3 | 10/2018 | |
| DE | 10 2017 206 988 A1 | 10/2018 | |
| DE | 10 2018 110 481 B3 | 3/2019 | |
| DE | 112017005676 T5 * | 9/2019 | B60K 1/04 |
| EP | 2 468 609 A2 | 6/2012 | |
| JP | 2006182295 A * | 7/2006 | |
| JP | 2008-174181 A | 7/2008 | |
| JP | 2011-121483 A | 6/2011 | |

OTHER PUBLICATIONS

German-language Written Opinion (PCT/ISA/237) issued in PCT Application No. PCT/EP2021/051668 dated Mar. 15, 2021, 2020 (five (5) pages).

German-language Search Report issued in German Application No. 10 2020 102 480.0 dated Nov. 4, 2020 with partial English translation (10 pages).

English translation of Chinese-language Office Action issued in Chinese Application No. 202180006866.1 dated Nov. 27, 2024 (7 pages).

* cited by examiner

ENERGY STORE FLOOR ASSEMBLY

BACKGROUND AND SUMMARY

The invention relates to an energy store floor assembly for an electrically drivable motor vehicle, a vehicle floor of the energy store floor assembly, a store housing in which an electrical energy store device is accommodatable, the store housing being arranged on the underside of the vehicle floor of the energy store floor assembly.

An energy store floor assembly of this type is known from EP 2 468 609 A1 in which a store housing, in which an electrical energy store device is accommodated, is arranged on the underside of a vehicle floor. The store housing itself is arranged inside a trough-like receptacle which is delimited laterally by respective side sills and to the front and rear by respective crossmembers. In order to provide sufficient rigidity for the body structure in the region of the safety passenger compartment, either the side sills and/or respective longitudinal members, which accordingly have to run above the vehicle floor inside the safety passenger compartment, have to have an appropriately large cross section. This leads not only to a considerable additional weight for the motor vehicle body, but also to construction space limitations in the interior of the safety passenger compartment. By this means, in particular, the ergonomics inside the safety passenger compartment are impaired.

It is therefore the object of the present invention to provide an energy store floor assembly of the type mentioned at the beginning which can be constructed more simply and more favorably in terms of weight.

This object is achieved according to the invention by an energy store floor assembly having the features of the independent claim. Advantageous refinements of the invention are the subject matter of the dependent claims.

The energy store floor assembly according to the invention is distinguished by a store housing in which, firstly, respective battery modules and electrical components of the energy store device are accommodated and which is arranged on the underside of the vehicle floor, and which, secondly, according to the invention accommodates a longitudinal member which runs inside the store housing and is connected at at least one end to a support component of the motor vehicle.

According to the invention, it is accordingly provided to arrange at least one longitudinal member in a manner running inside the store housing and to at least indirectly support same on an appropriately corresponding carrier component of the motor vehicle running in the region of the front structure of the motor vehicle such that corresponding forces in the region below the vehicle floor or below the safety passenger compartment can be transmitted via the longitudinal member. By this means, other longitudinal components, such as either the side sills and/or longitudinal members inside the interior of the motor vehicle, can be of smaller dimensions or can be omitted, thus resulting in a simplified design of the energy store floor assembly or of the entire motor vehicle body. In addition, the small dimensioning of respective longitudinal members and/or the omission of respective longitudinal members in the region of the interior of the safety passenger compartment makes it possible to obtain corresponding gains in construction space which are of benefit for the ergonomics of the interior of the motor vehicle. In addition, by integrating the at least one longitudinal member in the store housing of the energy store device below the vehicle floor, force paths or load paths can be produced which preferably extend at least substantially linearly and in one plane such that forces can be optimally transmitted.

In a further refinement of the invention, it is shown to be advantageous if the vehicle floor is designed as a housing part of the store housing and is connected to at least one further housing part of the store housing via at least one gastight connection. By this means, the longitudinal member can be designed in a simple manner as a bodyshell part of the floor assembly of the motor vehicle body, as a result of which a particularly advantageous connection to other support components of the motor vehicle body or other support components can be realized.

In this connection, it has been shown to be particularly advantageous, in a further refinement of the invention, if the at least one longitudinal member is fastened on the underside to the vehicle floor. The longitudinal member can therefore be used in an optimum manner for stiffening the vehicle floor and the floor assembly, and at the same time can in an optimum manner form a force path or load path below the safety passenger compartment.

A further advantageous embodiment of the invention makes provision for the at least one longitudinal member to be connected directly to the support component. By this means, forces, for example, from the front end region of the motor vehicle, can be supported and transmitted in an optimum manner to the rear in the longitudinal direction of the vehicle.

A further advantageous embodiment of the invention makes provision for the at least one longitudinal member to be connected to a further longitudinal member which is arranged below the latter and which is connected to a lower housing part of the store housing. The use of the two longitudinal members therefore results in a particularly advantageous assembly of the lower housing part of the store housing with the upper housing part of the store housing, which is preferably the vehicle floor.

A further advantageous embodiment of the invention makes provision for the at least one longitudinal member to run over the entire height of the store housing and to be connected to a lower housing part of the store housing. The longitudinal member is therefore suitable for directly connecting the lower housing part to the upper housing part of the store housing, which is preferably the vehicle floor.

Finally, it has been shown to be advantageous if the vehicle floor together with the at least one longitudinal member is designed as part of the painted motor vehicle bodyshell. A floor assembly which can be produced particularly advantageously and in which the at least one longitudinal member is designed in an optimum manner as part of the painted motor vehicle body is therefore produced.

The vehicle floor is preferably connected to the at least one longitudinal member nonreleasably. The connection can be realized in an integrally bonded manner, for example by a welded connection or an adhesive connection.

The vehicle floor and the longitudinal member can be connected to one another at a multiplicity of points over a length of the longitudinal member or can be connected to one another over substantially the entire length of the longitudinal member.

In an advantageous manner, the at least one longitudinal member is connected on its end side at least indirectly to the support component of the motor vehicle. Furthermore, the longitudinal member can be connected at least indirectly to the support component of the motor vehicle in a manner free from play. Furthermore, the connection can be realized nonreleasably, for example in an integrally bonded manner, for example by a welded connection or an adhesive connection.

A direct transmission of force without a deformation path is therefore possible between the support component and longitudinal member.

According to a preferred embodiment, a wall region of the vehicle floor runs between the longitudinal member and the support component such that the wall region is arranged in between.

By this means, the store housing is more simply designed to be leakproof.

Further features of the invention emerge from the claims, the figures and the description of the figures. The features and combinations of features mentioned above in the description, and the features and combinations of features mentioned below in the description of the figures and/or shown in the figures alone, are usable not only in the respectively specified combination, but also in other combinations or on their own.

The invention will now be explained in more detail using a preferred exemplary embodiment and with reference to the drawings.

BRIEF DESCRIPTION OF THE DRAWINGS

In the figures, identical or functionally identical elements are provided with the same reference sign.

DETAILED DESCRIPTION OF THE DRAWINGS

Figure 1:
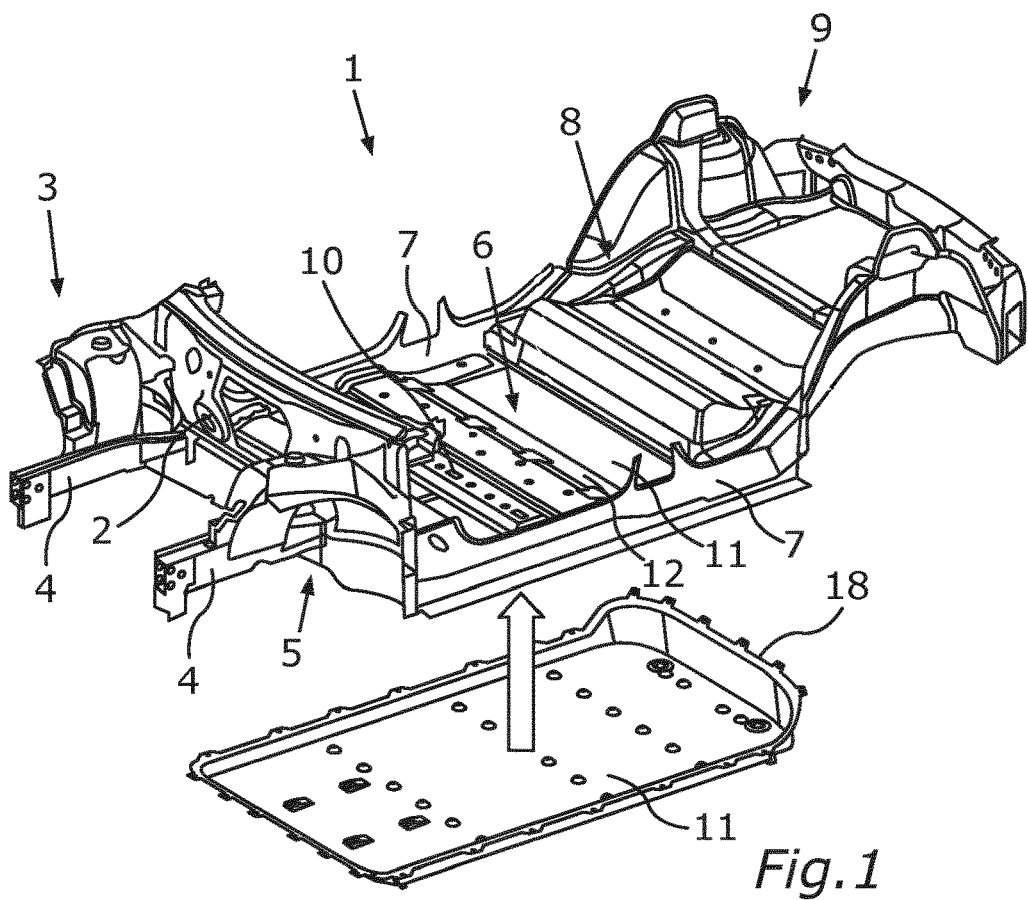
FIG. 1 is an exploded illustration of an energy store floor assembly for a motor vehicle according to one embodiment, in which a vehicle floor of the motor vehicle body forms a housing part of a store housing, on which, as a further housing part, a floor element can be attached according to the depicted arrow, as a result of which a gastight store housing for receiving an energy store device is created.

A motor vehicle body 1 for an electrically operable motor vehicle is illustrated in a perspective exploded view and a perspective view from below in FIGS. 1 and 2, respectively. This motor vehicle can be, for example, a motor vehicle having a fully electric drive (BEV) or a hybrid vehicle (PHEV) which, in addition to a purely electric drive, also has an internal combustion engine. In the present case, the motor vehicle body 1 comprises, in the usual manner, a front bulkhead 2 of a passenger compartment, which is adjoined toward the front by a front end or a front structure 3 which comprises, for example, respective longitudinal members/ engine supports 4 of a central longitudinal member plane. To the rear, the bulkhead 2 merges into a transition region 5, which comprises, for example, an obliquely running pedal box floor or the like, and from there merges into a vehicle floor 6, which delimits the passenger compartment downward as the main floor and reaches as far as side sills 7—which run on the outer side in the longitudinal direction of the vehicle and horizontally. To the rear, the vehicle floor 6 extends as far as a transition region 8 in which the vehicle floor 6 merges into a rear end structure 9.

Figure 2:
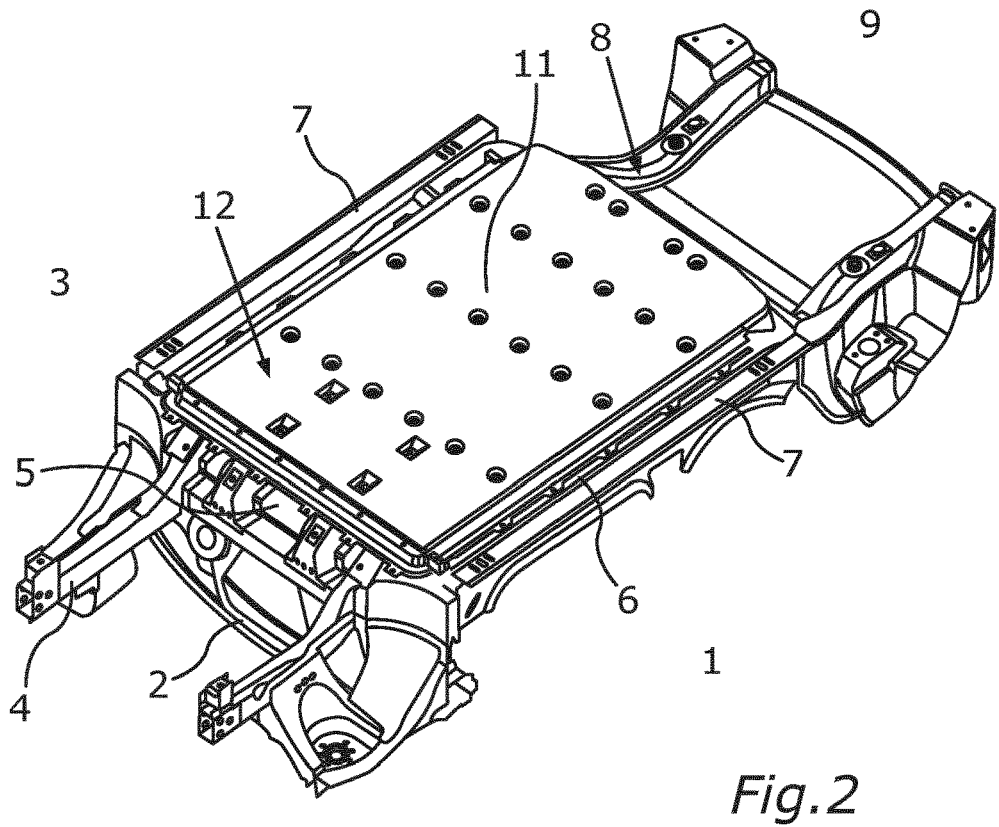
FIG. 2 is a perspective view from below of the energy store floor assembly having the store housing according to the embodiment in FIG. 1.

As can furthermore be seen from FIG. 1, a plurality of crossmembers 10 are arranged on the upper side of the vehicle floor 6 and are fastened, for example, via associated joining connections, in particular by welding, and which extend in the transverse direction of the vehicle and adjoin the respective side sills 7. In addition to the vehicle floor 6, the energy store floor assembly comprises a further housing element in the form of a floor panel or a floor element 11 which—as is apparent in particular from FIGS. 1 to 3—is configured in one part and, in the exemplary embodiment shown here, is configured to be at least substantially flat except for an edge region. This floor element 11 together with the vehicle floor 6 forms respective housing parts of a multi-part store housing 12 which is designed for receiving an electrical energy store device 14 which can be seen, inter alia, in a perspective view in FIG. 3 and which comprises a plurality of respective battery modules 13. The battery modules 13—as can be seen from FIG. 4—are combined to form respective battery packs 15, wherein respective support elements are provided in the form of pressure plates 16 which are connected to one another via corresponding clamping elements 17 and brace the individual battery modules 13 with one another.

The vehicle floor 6 and the floor element 11 are connected to one another in accordance with the arrow which can be seen in FIG. 1, with a gastight connection 18 which encircles on the outer circumferential side being provided. This gastight connection 18 can either be provided directly between the floor element 11 and the vehicle floor 6 or else between the floor element 11 and other bodyshell parts of the motor vehicle body 1 in order to form a corresponding gastight receiving space of the store housing 12.

Figure 3:
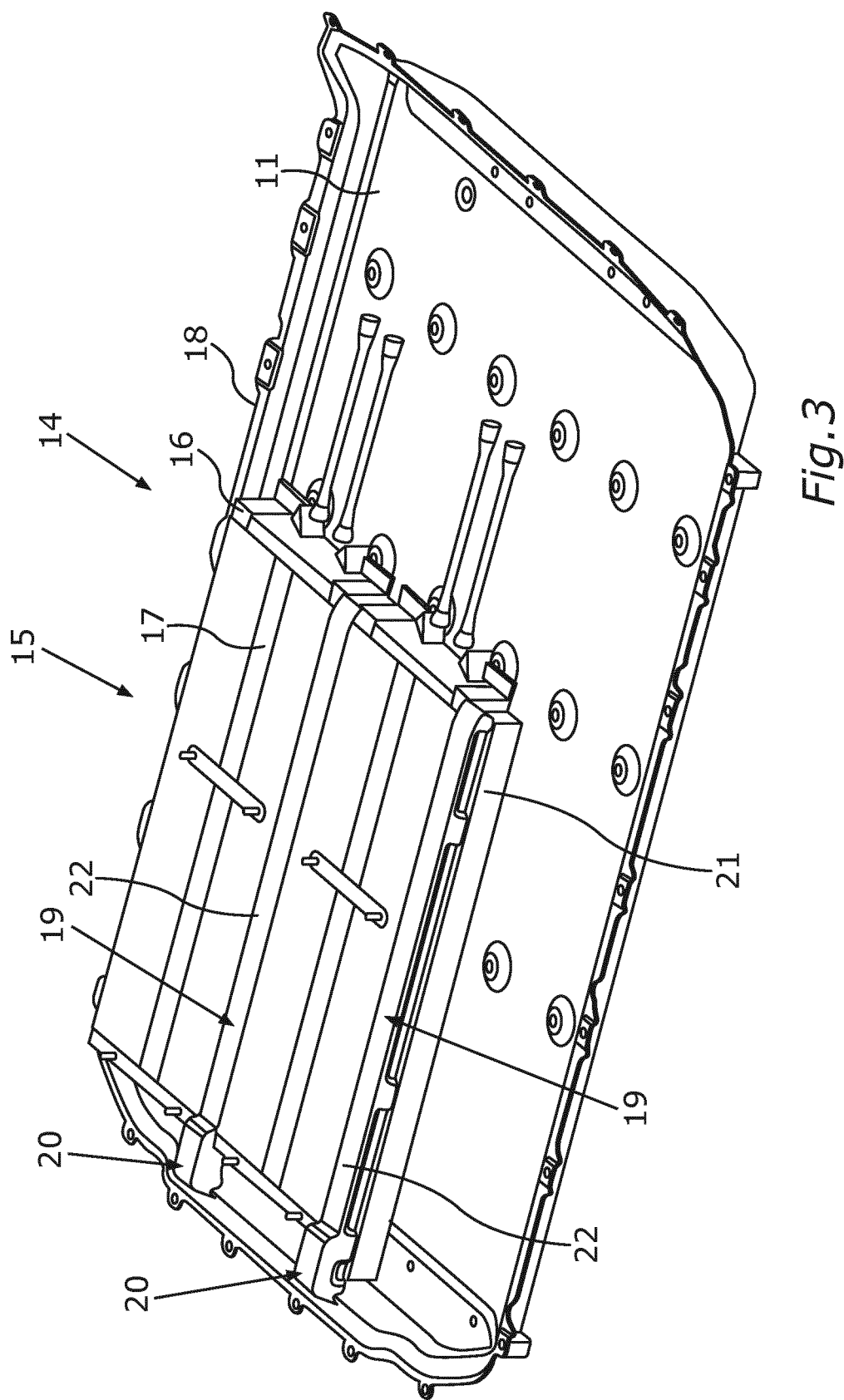
FIG. 3 is a perspective view of the floor element having a plurality of respective longitudinal members according to a first embodiment that are assembled with further longitudinal members which are arranged below them and which are connected in turn to the floor element, wherein, in the assembled state, the respective upper longitudinal members are fastened on the underside of the vehicle floor.
Figure 4:
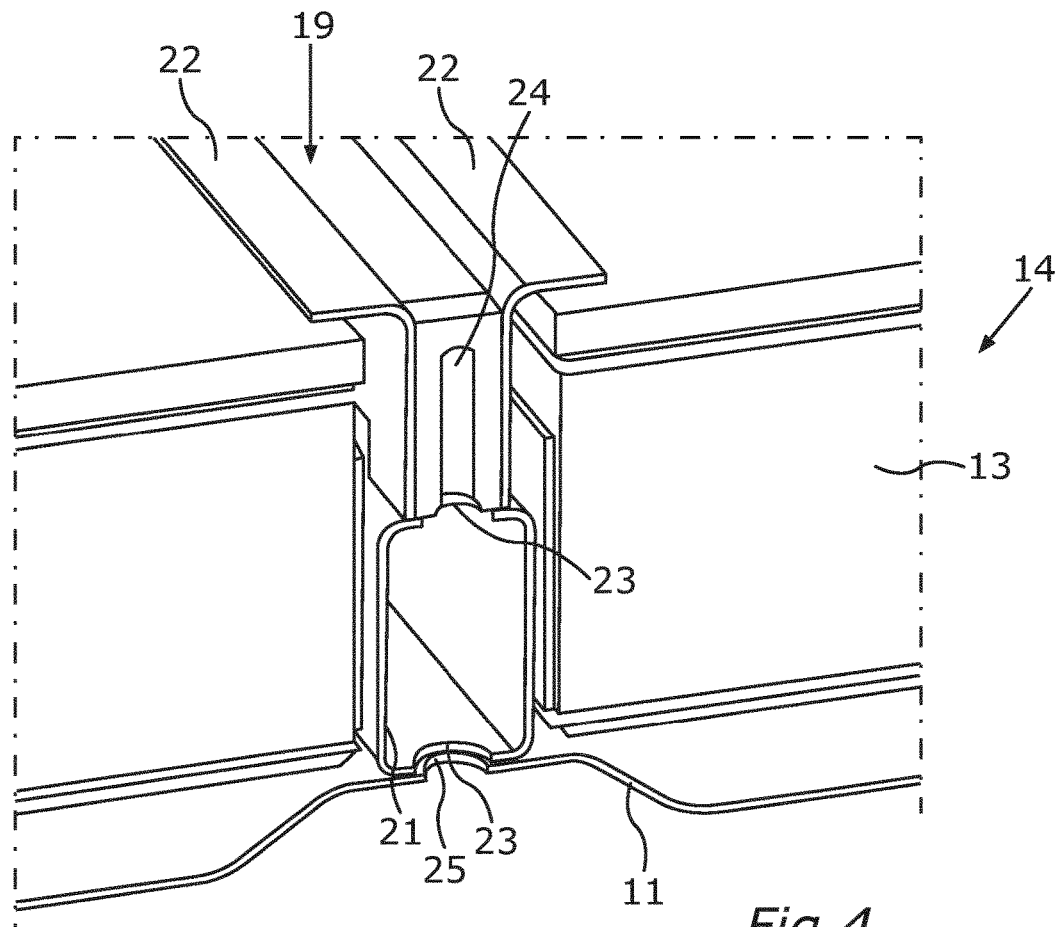
FIG. 4 is a partial and perspective sectional view of the energy store floor assembly according to the embodiment shown in FIG. 3, in which the floor element with the use of the respective longitudinal members is on the underside of the vehicle floor of the motor vehicle.

In particular according to FIG. 3, in the present case a plurality of longitudinal members 19 run inside the store housing 12, the longitudinal members being connected at at least one end 20, in the present case at the front end 20, to a support component of the motor vehicle in a manner described in more detail below. As can be seen in an overall view with FIG. 4, which shows the energy store floor assembly analogously to FIG. 3, the respective longitudinal members 19 each run merely over an upper partial height of the store housing 12 formed by the vehicle floor 6 and the floor element 11. A further longitudinal member 21 is in each case attached from below to the corresponding longitudinal member 19, the further longitudinal member 21 for its part, as can be seen from FIGS. 3 and 4, being connected to the lower housing part or floor element 11. The two longitudinal members 19, 21 therefore form an assembly which extends over the entire height of the store housing 12, i.e. over the complete distance between the floor element 11 and the vehicle floor 6. The two longitudinal members 19, 21 are connected to one another, for example, via a plurality of screw connections. By this means, the floor element 11 is also suspended on the underside of the vehicle floor 6. The respective battery modules 15 of the energy store device 14 can be supported either on the floor element 11 or can themselves be fastened in a suspended arrangement on the underside of the vehicle floor 6.

Figure 5:
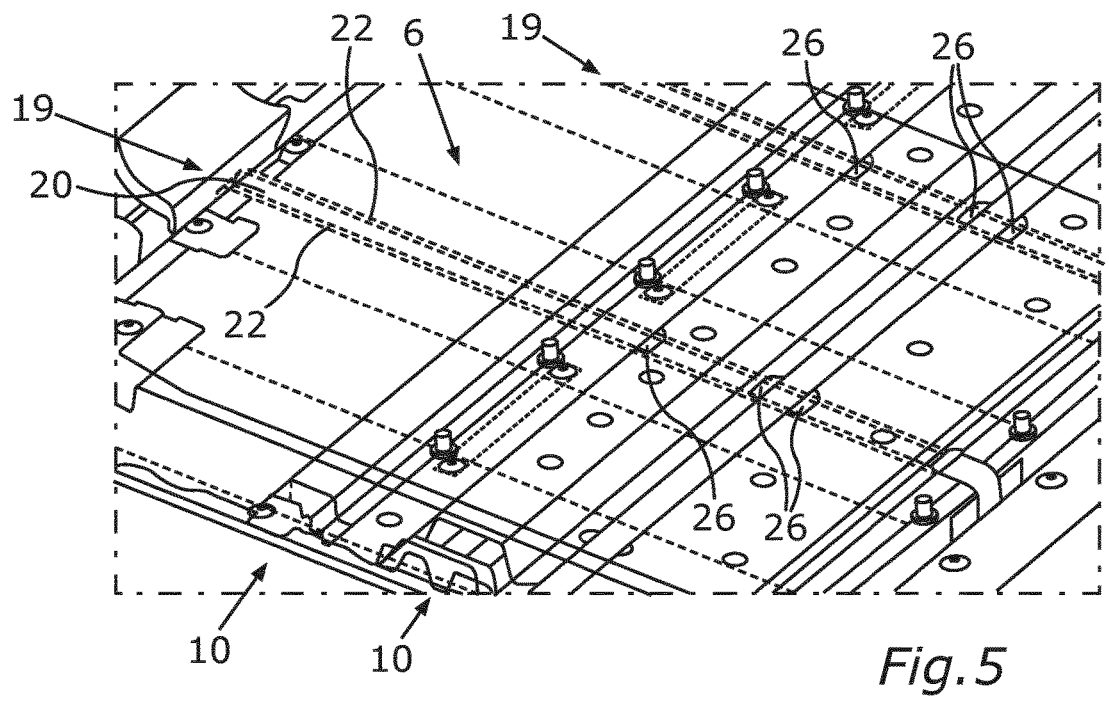
FIG. 5 is a partial and perspective top view of the vehicle floor, to which the respective longitudinal members are fastened on the underside, which longitudinal members are directly connected via the vehicle floor to respective crossmembers arranged on the upper side of the vehicle floor.

In an overall view of FIG. 5, which shows, in a partial perspective view, the vehicle floor 6 from above, it can be seen that the respective longitudinal members 19 are fastened via their flanges 22 on the underside of the vehicle floor, for example via respective welded connections or similar joining connections. Of course, other connections, in particular mechanical connections, are also contemplated. As can furthermore be seen from FIG. 4, the lower longitudinal member 21 has respective passage openings 23 and the associated upper longitudinal member 19 has a blind hole 24, and therefore, in the present case, the floor element 11, which likewise has a passage opening 25, can be screwed to the upper longitudinal member 19 by means of a corresponding screw. In the present case, the respective battery modules of the energy store device 14 rest on the floor element 11, which is fastened on the underside of the vehicle floor 6. However, a suspended arrangement of the energy store device 14 on the underside of the vehicle floor 6 would also be conceivable here.

FIG. 5 shows, in a partial view obliquely from above, an energy store floor assembly with the vehicle floor 6, on the upper side of which the respective crossmembers extend in the transverse direction of the vehicle. The respective longitudinal members 19 which extend in the longitudinal direction and therefore at an angle of approximately 90 degrees to the crossmembers 10 can likewise be seen. The longitudinal members 19 which run on the underside of the vehicle floor 6 are accordingly indicated here by dashed lines. In the region of respective tabs 26, the crossmembers 10 are connected directly here to the respective flanges 22 of the respective longitudinal member 19 via respective welded connections or similar joining connections and/or mechanical connections. Accordingly, the flanges 22 of the longitudinal members 19 are connected by the vehicle floor 6 to the respective tabs 26 of the crossmembers 10. By means of this virtually direct connection of the longitudinal members 19 to the crossmembers 10, the effect achieved is in particular that the crossmembers 10 are stabilized against buckling in the event of an accident-induced application of force in the transverse direction of the vehicle.

Figure 6:
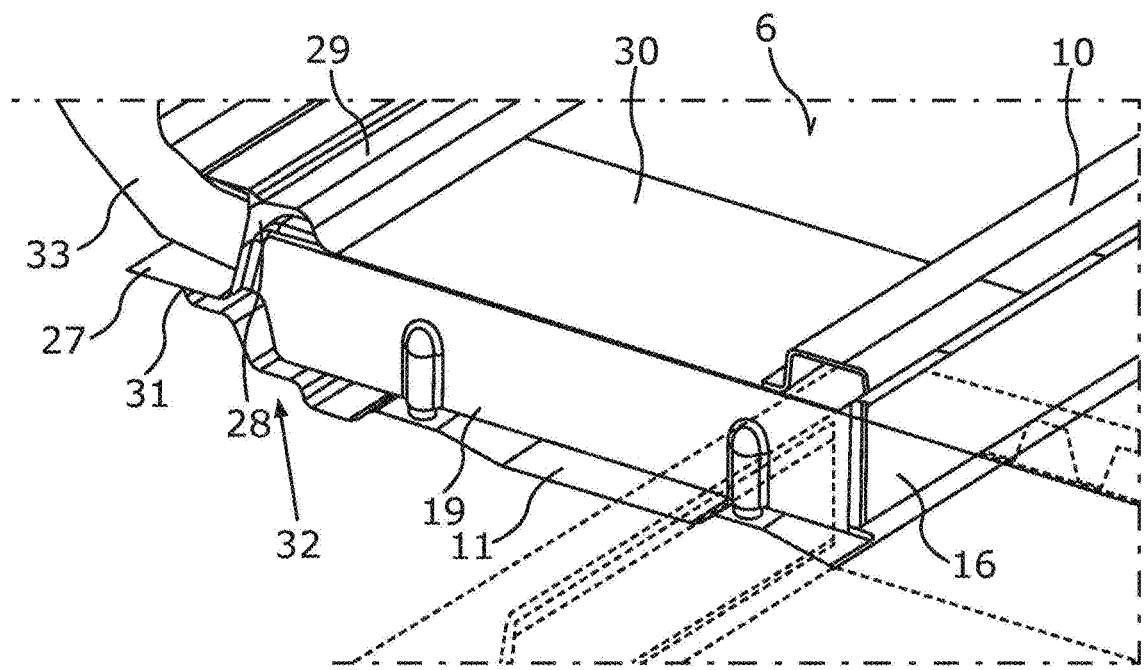
FIG. 6 is a further partial perspective sectional view of the energy store floor assembly according to a further embodiment, in which respective longitudinal members are provided which extend over the entire height of the store housing and connect the lower floor element to the vehicle floor.
Figure 7:
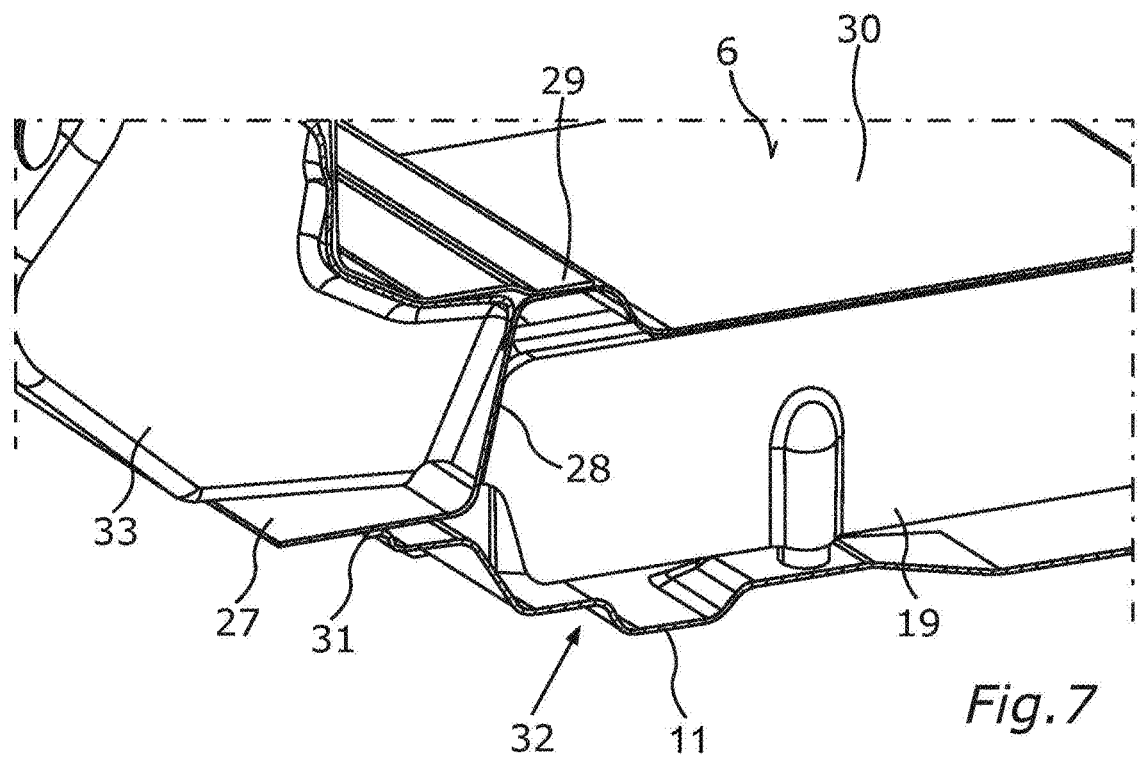
FIG. 7 is a partial and perspective sectional view of the energy store floor assembly according to the embodiment shown in FIG. 6, wherein it can be seen in particular that a support which runs in the region of a front structure and is in the form of an axle support or similar auxiliary frame is supported directly on the associated longitudinal member running inside the store housing.

FIGS. 6 and 7 show, in a perspective sectional view and in a perspectively enlarged sectional view, the specific support or connection of one of the longitudinal members 19 to a corresponding support component 33 which runs in the region of the front end 3 of the motor vehicle. In contrast to the previously shown embodiment, it should be noted here that the longitudinal member 19 in the present case runs over the entire height of the energy store device 14 or the store housing 12 which is formed and delimited on the upper side by the vehicle floor 6 and on the underside by the floor element 11. Since the store housing is therefore also a body-integrated housing here which is formed on the upper side by body components, essentially by the vehicle floor 6, a region of the front end is either correspondingly formed with a flange 27, with an obliquely running wall region 28 and an S-shaped region 29 which then merges into a flat region 30 of the vehicle floor 6. The vehicle floor 6 may optionally also be of multi-part design here. It would likewise be conceivable to form the delimitation toward the front by an end-side, separate part. In the present case, the flange 27 of the vehicle floor 6 is connected to a corresponding flange 31 of the floor element 11, which flange is likewise extended downward in a stepped manner in a region 32. In the present case, the front end 20 of the longitudinal member 19 is therefore connected indirectly— namely with the aid of the oblique region 28 of the vehicle floor 6—to the support component 33 in the region of the front structure 3. In the present exemplary embodiment, the support component 33 is for example a component of the front structure 3 that has an axle support connection or else is an axle support part itself.

By means of the at least indirect support of the support component 33—in the present case with the interposition or use of the oblique region 28 of the vehicle floor 6—this support component 33 or axle support part is therefore directly supported to the rear in the longitudinal direction of the vehicle (x direction) via the respective longitudinal member 19, as a result of which, in the event of an accident-induced application of force in the region of the front end, no excessive intrusions into the energy store, i.e. the energy store device 14 or the associated store housing 12, can take place. In other words, the effect achieved by the longitudinal members 19 fixed to the bodyshell and the underside of the vehicle floor and the connection of them to respective support profiles, in particular longitudinal profiles of the front structure, to which the front axle is fastened, is that excessive intrusions into the energy store or the associated components are avoided. In addition, the longitudinal members 19 in the underfloor region can support the crossmembers in the front end or the front end structure 3.

LIST OF REFERENCE SIGNS

1 Motor vehicle body
2 Front bulkhead
3 Front structure
4 Longitudinal member
5 Transition region
6 Vehicle floor
7 Side sill
8 Transition region
9 Rear end structure
10 Crossmember
11 Floor element
12 Store housing
13 Battery module
14 Energy store device
15 Battery pack
16 Pressure plate
17 Clamping elements
18 Gastight connection
19 Longitudinal member
20 End
21 Longitudinal member
22 Flange
23 Passage opening
24 Blind hole 25 Passage openings
26 Tab
27 Flange
28 Wall region
29 Region
30 Region
31 Flange
32 Region
33 Support component

The invention claimed is:

1. An energy store floor assembly for an electrically drivable motor vehicle, comprising:
 a vehicle floor of the energy store floor assembly;
 a store housing in which an electrical energy store device is accommodatable, the store housing being arranged on an underside of the vehicle floor of the energy store floor assembly;
 at least one longitudinal member arranged inside the store housing of the energy store device, the at least one longitudinal member being connected indirectly at at least one end to a support component of the motor vehicle arranged in a region of a front end of the motor vehicle;
 a wall region of the vehicle floor arranged between the at least one longitudinal member and the support component,
 wherein the support component is not part of the store housing.

2. The energy store floor assembly according to claim 1, wherein
 the vehicle floor is configured as a housing part of the store housing and is connected to at least one further lower housing part of the store housing via at least one gastight connection.

3. The energy store floor assembly according to claim 2, wherein
 the at least one longitudinal member is fastened on the underside to the vehicle floor.

4. The energy store floor assembly according to claim 3, wherein
 the at least one longitudinal member is connected to a further longitudinal member which is arranged below the at least one longitudinal member and which is connected to the further lower housing part of the store housing.

5. The energy store floor assembly according to claim 3, wherein
 the at least one longitudinal member runs over the entire height of the store housing and is connected to the further lower housing part of the store housing.

6. The energy store floor assembly according to claim 1, wherein
 the at least one longitudinal member is connected to at least one crossmember running on an upper side of the vehicle floor.

7. The energy store floor assembly according to claim 1, wherein
 the vehicle floor together with the at least one longitudinal member is designed as part of a painted motor vehicle body shell.

8. The energy store floor assembly according to claim 1, wherein
 the vehicle floor is connected non-releasably to the at least one longitudinal member.

9. The energy store floor assembly according to claim 8, wherein
 the connection is an integrally bonded connection.

10. The energy store floor assembly according to claim 9, wherein
 the integrally bonded connection is a welded connection or an adhesive connection.

11. The energy store floor assembly according to claim 1, wherein
 the at least one longitudinal member is connected at least indirectly to the support component of the motor vehicle in a manner free from play.

12. The energy store floor assembly according to claim 11, wherein
 the connection is an integrally bonded connection.

13. The energy store floor assembly according to claim 12, wherein
 the integrally bonded connection is a welded connection or an adhesive connection.

14. The energy store floor assembly according to claim 1,
 wherein the vehicle floor is configured as a housing part of the store housing and is connected to at least one further lower housing part of the store housing,
 wherein a region of the front end of the vehicle floor comprises a flange that merges, via an obliquely running wall that forms the wall region, into a flat region of the vehicle floor,
 wherein the flange is connected to a corresponding flange of the further lower housing part, whereby the at least one longitudinal member is connected indirectly by the obliquely running wall forming the wall region to the support component.

* * * * *